United States Patent [19]

Stolz

[11] Patent Number: 4,676,409
[45] Date of Patent: Jun. 30, 1987

[54] GREASE GUN AND METHOD FOR MAKING SUCH A GUN

[75] Inventor: Hermann Stolz, Muehlheim, Fed. Rep. of Germany

[73] Assignee: MATO Maschinen- und Metallwarenfabrik Kurt Matthaei GmbH & Co. KG., Offenbach am Main, Fed. Rep. of Germany

[21] Appl. No.: 857,294

[22] Filed: Apr. 29, 1986

[30] Foreign Application Priority Data

May 11, 1985 [DE] Fed. Rep. of Germany ....... 3517123

[51] Int. Cl.$^4$ ............................................. G01F 11/00
[52] U.S. Cl. .................................... 222/256; 222/383; 29/156.4 R; 29/157 C; 29/157.1 R; 184/105.1; 184/28
[58] Field of Search ............... 222/256, 383, 324, 386; 184/105.1, 105.2, 38.1, 28; 29/156.4 R, 156.4 W, 157 R, 157 C, 157.1 R

[56] References Cited

U.S. PATENT DOCUMENTS

| | | | |
|---|---|---|---|
| 1,608,748 | 11/1926 | Hundemer | 222/256 |
| 1,662,842 | 3/1928 | Albertine | 184/105.2 |
| 1,750,150 | 3/1930 | Albertine | 222/256 |
| 2,340,479 | 2/1944 | Libseen | 222/324 |
| 2,612,296 | 9/1952 | Campbell et al. | 222/385 |
| 3,176,624 | 4/1965 | Sundholm | 222/324 |
| 3,627,178 | 12/1971 | Sundholm . | |
| 4,077,494 | 3/1978 | Spaude et al. . | |
| 4,168,787 | 9/1979 | Stamper | 222/256 |
| 4,298,144 | 11/1981 | Pressl | 222/256 |

FOREIGN PATENT DOCUMENTS

| | | | |
|---|---|---|---|
| 1475542 | 5/1969 | Fed. Rep. of Germany . | |
| 2041260 | 3/1971 | Fed. Rep. of Germany . | |
| G8435373 | 4/1985 | Fed. Rep. of Germany . | |
| 276474 | 9/1927 | United Kingdom | 222/256 |
| 450436 | 7/1936 | United Kingdom . | |
| 576038 | 3/1946 | United Kingdom . | |

*Primary Examiner*—H. Grant Skaggs
*Attorney, Agent, or Firm*—W. G. Fasse; D. H. Kane, Jr.

[57] ABSTRACT

A grease gun has a grease container with a low pressure piston, and a high pressure part with a high pressure piston in a passage. The high pressure part is located on a cap screwed to the grease container. The high pressure part is connected through a hole with the interior of the grease container and has an outlet nozzle extending perpendicularly to the high pressure piston and having a passage and a valve. A hand lever is journalled to the high pressure piston and mounted on a pivoting link joining it to the high pressure part. The high pressure part and the outlet nozzle are made as an integral one piece component bend of round steel stock pressed and bent into an L-shape into which the necessary passages are formed after the bending and pressing. These passages may be formed also by pressing, or drilling, or the like.

13 Claims, 4 Drawing Figures

GREASE GUN AND METHOD FOR MAKING SUCH A GUN

FIELD OF THE INVENTION

The invention relates to grease guns and more specifically to a grease gun of the type comprising a grease container with a low pressure piston, and with a high pressure piston in a passage in a high pressure part, which is located on a cap with screw means for attachment to the grease container. The high pressure part is connected through a hole with the interior of the grease container and has an outlet nozzle extending perpendicularly to the high pressure piston. The outlet nozzle has a passage and a valve, whereby a hand lever is pivotally connected to the high pressure piston and to a pivoting link mounted to the high pressure part. The invention also relates to a method for making such grease guns.

DESCRIPTION OF THE PRIOR ART

Hand operated grease guns of this type are known, for instance, from two U.S. Pat. Nos. 3,627,178 and 4,077,494 and are used in large numbers. After unscrewing the cap, these guns may be filled with grease and the low pressure piston then pushes the grease into the high pressure part. With the aid of the hand lever pivoted on the high pressure part the grease is forced out of the high pressure part by displacing the high pressure piston; due to the leverage of the hand lever very high pressures may be produced.

In the hand grease gun shown and described in U.S. Pat. No. 3,627,178 the high pressure part consists of a piece of tube, an outlet nozzle and a stopper. The outlet nozzle has a passage which forms a continuation of the piece of tube and has a through-bore that is shut off at its end with the aid of the stopper, and an outlet passage extends perpendicularly to the through-bore. The outlet nozzle is attached to an end face of the piece of tube by a circumferential welding seam.

In the case of the grease gun disclosed in U.S. Pat. No. 4,077,494 the high pressure part consists of a cylinder and a connection pipe, which extends through the cylinder near its end plate. Both the cylinder and the outlet nozzle have transverse holes in addition to their longitudinal holes so that on the one hand the outlet nozzle is able to fit into the cylinder and on the other hand the grease under high pressure is able to make its way into the outlet nozzle. The outlet nozzle is attached by an outward swagging of its one end forming a rivet type connection.

In the high pressure part and therefore also at the joint between the piece of tube and the cylinder, respectively, pressures as high as 400 bar occur during use of the gun. The gun furthermore has to withstand a pressure of as high as 800 bar under functional safety tests.

The production of the high pressure part therefore has to take place with meticulous care since any flaw in the welding seam or in the riveted end member will immediately lead to a leak making the gun unsuitable for further service.

Furthermore, grease guns are known which are operated by a hand lever and have a high pressure part of square cross-section with a cylindrical passage to which a pipe member serving as an outlet nozzle, is either welded or attached by screw means. In this case the welding seam and especially the screw connection are not entirely satisfactory because there is insufficient space at the connection of the outlet nozzle for the necessary connecting means, especially the number of screw threads require more space than is available.

Both in the case of the last-mentioned hand lever grease gun and als in the grease gun of U.S. Pat. No. 3,627,178 the pivoting link on the hand lever is secured to the high pressure part with the aid of a rivet. The hole for the rivet is located either in the outlet nozzle or in the high pressure part.

German Patent Publication (DE-OS) 1,475,542 discloses a hand lever grease gun having a high pressure part including the outlet nozzle and the cap element fashioned of a single piece of material, as, for example, pressure cast aluminum, pressure cast zinc, or resin. However, none of these constructions would lead to the desired accuracy or long service life that is possible with a component made of steel.

SUMMARY OF THE INVENTION

In view of the above prior art, it is one object of the invention to devise measures with the aid of which the manufacture of the high pressure part is simplified.

A further object of the invention is to assure a maximum degree of operational reliability even under the high occurring pressures.

In order to achieve these or other objects appearing in the course of the present specification, the high pressure part or section and the outlet nozzle are made as an integral component in the form of a single piece of round steel stock pressed and bent into an L-form and provided with the necessary passages.

Due to the integral construction and the use of steel, all problems occurring so far have been solved. Weak points tending to leak or burst have been avoided. Furthermore, the desired degreee of precision and long service life are assured. The disadvantages of the known high pressure parts in the form of multi-part assemblies and those of known integral high pressure parts are thus avoided.

The starting material is preferably steel wire, that is cut to size, bent into an L-shape and is so pressed that it has a sufficient engagement surface for attachment to the cap. Furthermore, it is possible to produce the passages for the high pressure piston in the long limb and for the outlet in the short limb of the L-shaped structure without any trouble, the passage for the high pressure piston being finished only after attachment to the cap.

The production of a high pressure part made of a rolled wire member is generally more economical and leads to a greater degree of reliability than is the case with prior art high pressure parts.

A further decrease in production costs is possible if, in accordance with a further feature of the invention, the outlet end of the high pressure part has a knife edge bearing for the pivoting link. The pivoting link is thus not mounted on a pin or rivet but by means of a cleat which has an opening into which the outlet nozzle is fitted so that the cleat engages a notch in the outlet nozzle.

Further features of the invention will be gathered from the specification and the claims as taken in conjunction with the drawings.

Embodiments of the invention will now be described in more detail with reference to the drawings.

Figure 1:
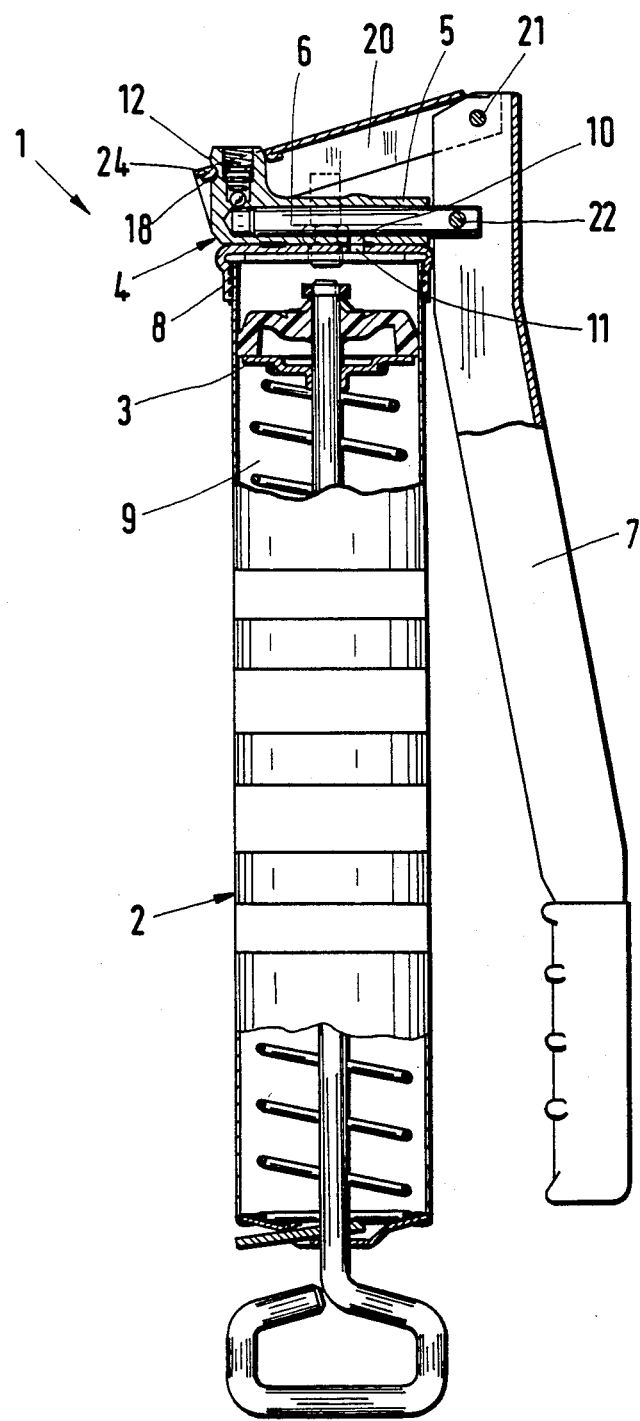
FIG. 1 shows a hand lever operated grease gun, partly in section.

DETAILED DESCRIPTION OF PREFERRED EXAMPLE EMBODIMENTS AND OF THE BEST MODE OF THE INVENTION

A grease gun 1 for operation by a hand lever 7 comprises a grease container 2 with a low pressure piston 3 and a high pressure part 4 with a passage 5, in which a high pressure piston 6 is axially reciprocatable by the lever 7. The high pressure part 4 is mounted on a cap 8 screwed to the grease container 2 and its passage 5 is connected with the interior 9 of the grease container 2 through a passage 10 and an orifice 11 in the cap 8. The passage 5 does not extend through the high pressure part but is rather in the form of a blind hole with a side orifice. The pressure part 4 is secured to the cap 8, e.g., by weldings 17', brazing, soldering, or even by an adhesive.

The high pressure part 4 furthermore includes an outlet nozzle 12 extending at a right angle to the high pressure piston 6 and in the nozzle 12 there is an offset passage 13 and a valve 14 with a valve spring 15.

The high pressure part 4 and its outlet nozzle 12 are made as an integral, single piece component in the form of an L-bend by pressing a member 16 of round stock into the L-bend and by then forming the passages 5, 10 and 13 into the L-bend. This member 16 of round stock is made of steel, preferably in the form of rolled wire, which is first bent into the L-shape and then pressed to produce a flat base surface 17 thereon. The outlet nozzle 12 is pressed so that it is outwardly curved as shown at 25 and further pressing forms a bearing notch 18. Preferably, the material is displaced at 19 to produce an outward bulge 19 showing the location of a passage 5 which is formed into the L-bend after the bending and pressing. The passages 10 and 13 are also formed after the bending and pressing. The passage 5 is finished to its final dimension only after attachment of the high pressure part 4 to the cap 8.

The hand lever 7 pivotally connected with or journalled to the high pressure piston 6 and to the pivoting link 20 by journal pins 21 and 22, respectively. The pivoting link 20 is mounted to the high pressure part 4 by means of a knife bearing. The pivoting link 20 is, for this purpose, provided with a hole into which the outlet nozzle 12 is fitted with a cleat 24 forming an opening 23 placed around the outlet nozzle 12 of the high pressure part 4. This cleat 24 is best made of two layers of material of the pivoting link 20 which has a channel cross-section, for instance, and fits into the pressed bearing notch 18.

The curved surface 25 of the outlet nozzle 12 opposite to the bearing notch 18 is preferably made so that it is somewhat crowned or convex and so that the edge 26 of the hole 23 in the cleat 24 may bear against the surface 25 with minimum friction when the high pressure piston 6 is pulled out of the passage 5. There is a slight friction between the cleat 24 and the notch 18 forming the knife bearing. Such minimal frictions are acceptable.

Figure 2:
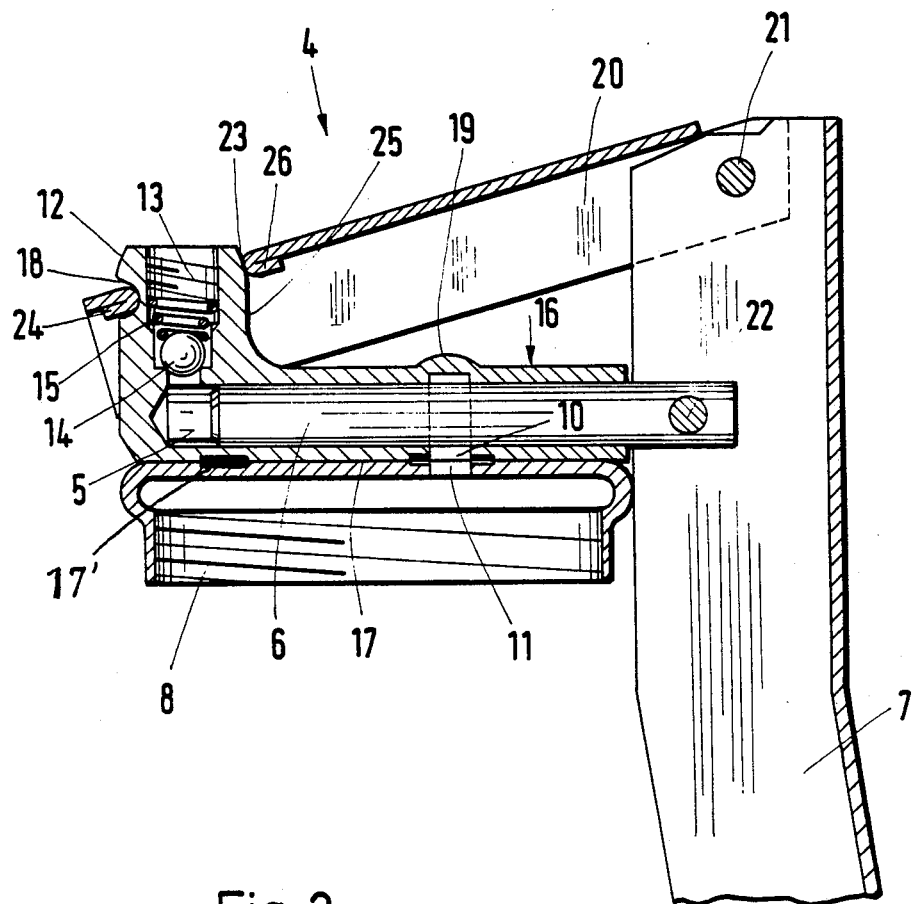
FIG. 2 shows a longitudinal section through the high pressure part on a larger scale.
Figure 3:
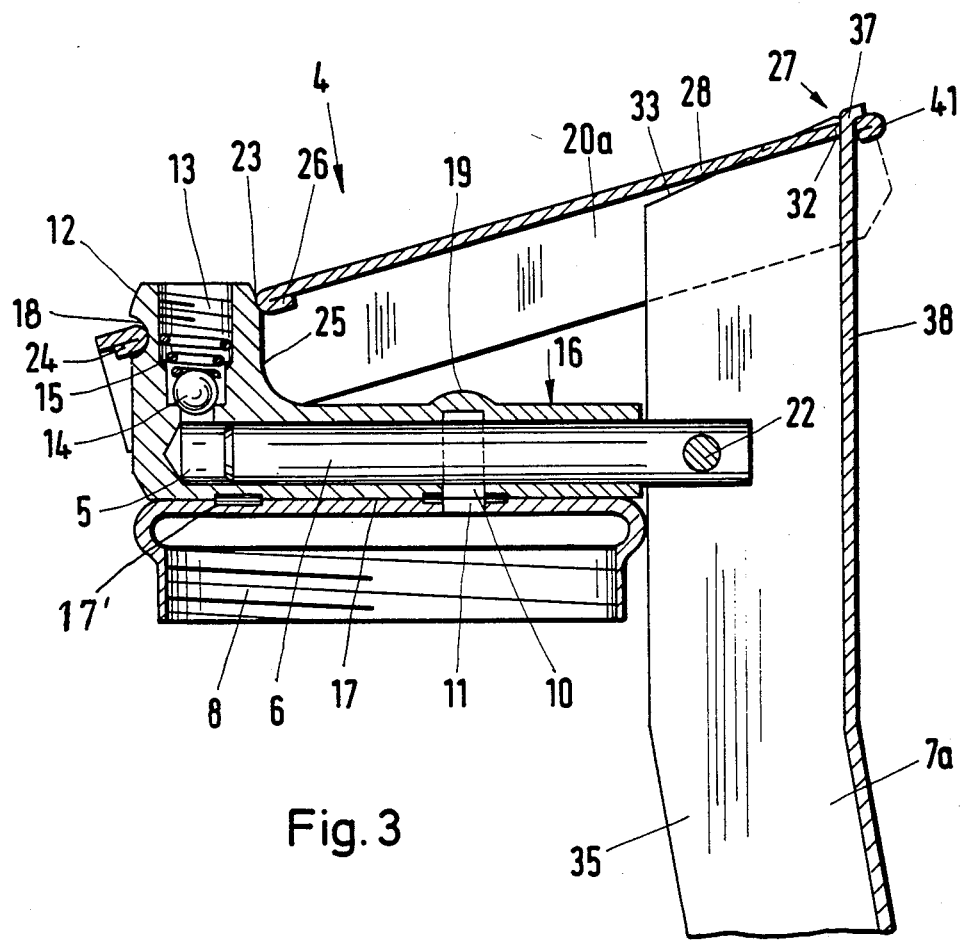
FIG. 3 is a section as that of FIG. 2, but of a modified embodiment of the invention.
Figure 4:
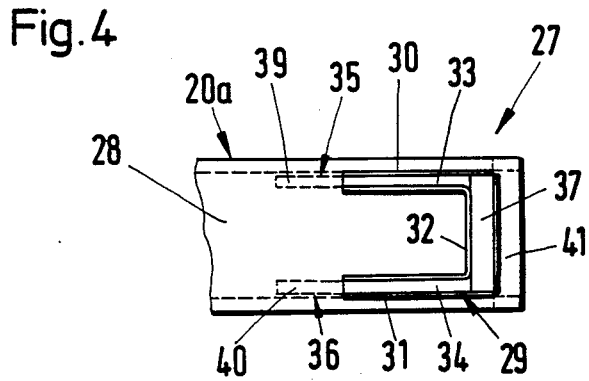
FIG. 4 is a view from above to show a detail of the structure of FIG. 3.

The example of the invention shown in FIGS. 3 and 4 differs from the example of FIGS. 1 and 2 only in that the pin 21 connecting the hand lever 7 with the pivot link 20 is replaced by a further knife bearing 27. To this end the web 28 of the pivot link 20a has a U-type recess 29, having slots 30, 31 and 32. The free edges 33 and 34 of the limbs 35 and 36, and the bent edge 37 of the web 38 of the channel section hand lever 7a are located in these slots 30, 31, and 32 respectively. The free edges 33, 34 of the limbs 35 and 36 are furthermore placed somewhat obliquely or at an acute angle to the web 28 of the pivot link 20a and reach with end parts 39 and 40 under the web 28 so that support faces are formed at the limbs 35 and 36. Furthermore, the bent edge 36, fitting through the slot 32, of the hand lever 7a engages a double folded edge part 41 of the web 28 of the pivot link 20a. The pivot link 20a and the hand lever 7a are therefore permanently joined together in conjunction with the pin 22, whereby the part resting in the slot 32 of the outwardly bent edge 37 forms the knife bearing 27 proper.

The manufacturing steps for making the present grease gun, especially its high pressure section 4 involves cutting a length of steel stock, preferably round steel stock, bending the cut-off length to form the longer leg or member 16 and the shorter leg or nozzle 12, which together form the L-bend, pressing the longer leg to form the flat base surface 17 of sufficient size for firmly seating the high pressure section on the surface of the cap 8, and then forming the bores 5, 10 and 13 for the high pressure chamber and for the nozzle respectively. The bores 5, 10, 13 may be formed by pressing, drilling, machining, or the like. Preferably, the steel stock is produced on a rolling mill.

Where rectangular or square stock is bent into the L-bend, the forming of the flat surface 17 might not be necessary. The L-bend is then pressed to form the bearing notch 18 and the curved surface 25 for the pivoting link 20. The same or another pressing operation may form the bulge 19 in the area of the bore or hole 10. Then the so prepared L-bend is secured to the cap 8 as by spot weldings 17'. After the L-bend has been secured to the cap 8 the final dimension of the bore 5 for the high pressure chamber is completed, e.g., by a fine grinding.

Although the invention has been described with reference to specific example embodiments, it will be appreciated, that it is intended to cover all modifications and equivalents within the scope of the appended claims.

What I claim is:

1. A high pressure pump section for a grease gun, comprising a single piece integral, pressed member of solid sectional steel stock bent into an L-shape having a first leg and a second leg, said first and second legs forming a housing, a longitudinal piston passage extending axially in one of said legs, a high pressure piston adapted to reciprocate in said longitudinal piston passage, a cap with a screw thread means for attachment to a grease gun container, said one leg of said housing having at least one flat surface, means for mounting said one leg with its flat surface on said cap, said one leg further having a second passage joining said piston passage with a space within said grease gun container, an outlet nozzle in said other leg of said housing, said outlet nozzle extending substantially at a right angle from said piston passage and having a third passage in said outlet nozzle, a valve placed in said third passage in said nozzle, a hand lever connected with said high pressure piston for operating said piston in said piston passage, a pivot link pivoted to said hand lever, and means operatively securing said pivot link to said housing for operating said high pressure piston.

2. The high pressure pump section of claim 1, wherein said single piece of integral, pressed member is made of round steel stock in the form of a rolled wire member.

3. The high pressure pump section of claim 2, wherein said piston passage is in the form of a blind hole, said third passage forming a side orifice leading into said nozzle.

4. The high pressure pump section of claim 1, wherein said means for operatively securing said pivot link to said housing has a bearing notch near an outlet end of said second leg for holding said pivot link and to form a knife bearing.

5. The high pressure pump section of claim 4, wherein said pivot link has an opening into which said second leg of said housing is fitted, and wherein said pivot link comprises a cleat fitting into said bearing notch.

6. The high pressure pump section of claim 5, wherein said cleat is made of two layers of material.

7. The high pressure pump section of claim 1, comprising a journal pin forming a pivot joint between said high pressure piston and said hand lever, said hand lever comprising a knife bearing connecting it with said pivot link.

8. A method for making a high pressure pump section for grease guns having a grease container with a low pressure piston and a cap closing the grease container and carrying said high pressure section, including a housing and a high pressure piston in said housing, comprising the following steps:

(a) cutting a length of solid sectional steel stock for forming said housing;
(b) bending said length of solid sectional steel stock into an L-bend with a first leg and a second leg;
(c) providing one of said legs with a flat mounting surface for firmly seating said flat mounting surface on said cap;
(d) forming a longitudinal axial dead end hole into said one leg to provide a high pressure cylinder chamber in said housing for said high pressure piston;
(e) forming a first through-hole axially into said other leg to provide a discharge nozzle connected to said dead end hole; and
(f) forming a second through-hole into said one leg for connecting said high pressure piston chamber to said grease container through a hole in said cap.

9. The method of claim 8, comprising using rolled round steel stock for forming said L-bend.

10. The method of claim 9, performing said bending so that said first leg is longer than said second leg, and providing said flat mounting surface on said longer leg by pressing said longer leg.

11. The method of claim 10, further comprising pressing a bearing groove and a curved bearing surface (25) on said shorter leg for mounting a pivoting link.

12. The method of claim 10, further comprising pressing a bulge into said longer leg where said second through-hole (10) is located.

13. The method of claim 8, further comprising finishing said dead end hole to an exact dimension after said L-bend has been secured to said cap.

* * * * *